(12) United States Patent
Brazeau et al.

(10) Patent No.: US 9,663,292 B1
(45) Date of Patent: May 30, 2017

(54) FORECASTED ROBOTIC DRIVE UNIT DISPATCH

(71) Applicant: Amazon Technologies, Inc., Seattle, WA (US)

(72) Inventors: Jeremiah David Brazeau, Hudson, NH (US); Tristan Bellman-Greenwood, Lawrence, MA (US); Colin Brazeau, Hudson, NH (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/261,581

(22) Filed: Sep. 9, 2016

(51) Int. Cl.
| | |
|---|---|
| *G06F 7/00* | (2006.01) |
| *B65G 1/04* | (2006.01) |
| *B65G 1/10* | (2006.01) |
| *G06Q 10/04* | (2012.01) |
| *G05D 1/00* | (2006.01) |
| *G05D 1/02* | (2006.01) |

(52) U.S. Cl.
CPC ............ *B65G 1/0492* (2013.01); *B65G 1/10* (2013.01); *G05D 1/0027* (2013.01); *G05D 1/0214* (2013.01); *G06Q 10/04* (2013.01); *G05D 2201/0216* (2013.01)

(58) Field of Classification Search
None
See application file for complete search history.

(56) References Cited

U.S. PATENT DOCUMENTS

| | | | | |
|---|---|---|---|---|
| 8,893,647 | B2* | 11/2014 | Iwashima | B05C 17/00516 118/300 |
| 2004/0010337 | A1* | 1/2004 | Mountz | G05D 1/0274 700/214 |
| 2013/0262336 | A1* | 10/2013 | Wan | G06Q 10/0836 705/339 |
| 2014/0365258 | A1* | 12/2014 | Vestal | G06Q 10/06311 705/7.15 |
| 2015/0283702 | A1* | 10/2015 | Izhikevich | B25J 9/163 700/257 |

* cited by examiner

*Primary Examiner* — Yolanda Cumbess
(74) *Attorney, Agent, or Firm* — Thomas | Horstemeyer LLP; Michael J. D'Aurelio; Jason M. Perilla

(57) ABSTRACT

Forecasted drive unit dispatch is described. An inventory pod associated with a materials handling action is identified, and a first drive unit is requisitioned and dispatched to retrieve the inventory pod and return it to a materials handling station. Concurrently, the ongoing status of other materials handling actions are monitored over time. Based on the ongoing status, a timeframe for the completion of another materials handling action is determined. An inventory pod zone associated with the other materials handling action is identified, and a second drive unit is dispatched on a forecasted route toward the inventory pod zone based on the timeframe. Later, the second drive unit is redirected to a particular inventory pod within the inventory pod zone. The second drive unit arrives at the particular inventory pod in less time because it was dispatched on the forecasted route toward the inventory pod zone earlier.

20 Claims, 6 Drawing Sheets

FORECASTED ROBOTIC DRIVE UNIT DISPATCH

BACKGROUND

Inventory, materials handling, and fulfillment center systems, such as those in materials handling centers, warehouses, distribution centers, and custom-order manufacturing facilities, face challenges in gathering requested items from inventory. For example, as the inventory of items at these centers grow, the time and effort required to execute the larger number of picking, packing, storing, and other inventory-related tasks becomes more and more of a challenge.

For automated inventory systems, the inefficient utilization of system resources including space, time, equipment, and power can result in lower throughput, unacceptably long response times, an ever-increasing backlog of unfinished tasks, and poor system performance. Additionally, the modification of automated inventory systems often requires significant changes to existing infrastructure and equipment. Thus, the cost of even incremental changes can be prohibitively expensive in many cases, limiting the ability of automated inventory systems to accommodate fluctuations in demand.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As noted above, the inefficient use of automated inventory system resources including space, time, equipment, and power can result in lower throughput, unacceptably long response times, an ever-increasing backlog of unfinished tasks, and poor system performance. Additionally, the modification of automated inventory systems often requires significant changes to existing infrastructure and equipment. Thus, the cost of even incremental changes can be prohibitively expensive in many cases, limiting the ability of automated inventory systems to accommodate fluctuations in demand.

In the context of increased efficiency using automated inventory system resources and equipment, the embodiments described herein are directed to forecasted robotic drive unit dispatch. According to aspects of the embodiments, the need for robotic drive units at certain locations or zones in a materials handling center is anticipated or forecasted over time. While a number of robotic drive units are requisitioned and dispatched on materials handling routes to retrieve various inventory pods, other robotic drive units are dispatched on forecasted routes with or without a defined goal. In one example case, based on the ongoing status of materials handling actions (e.g., picking, packing, assembling, inspecting, etc.) in a materials handling center, a forecasted timeframe for the completion of materials handling actions is determined over time. One or more inventory pod zones associated with those later-occurring materials handling actions are identified, and additional, unrequisitioned (e.g., idle) drive units are dispatched on forecasted materials handling routes toward the inventory pod zones.

The additional drive units can be considered unrequisitioned because they have yet to be assigned to any particular task, such as retrieving an inventory pod, moving an inventory pod, returning an inventory pod, charging, etc. At some time after the unrequisitioned drive units are dispatched on the forecasted routes, one or more of them can be redirected to retrieve a particular inventory pod, for example, or some other specific task. The additional drive units can arrive at inventory pods in less time than it would have taken them otherwise, because they were dispatched and put into motion on forecasted routes at an earlier time.

Figure 1:
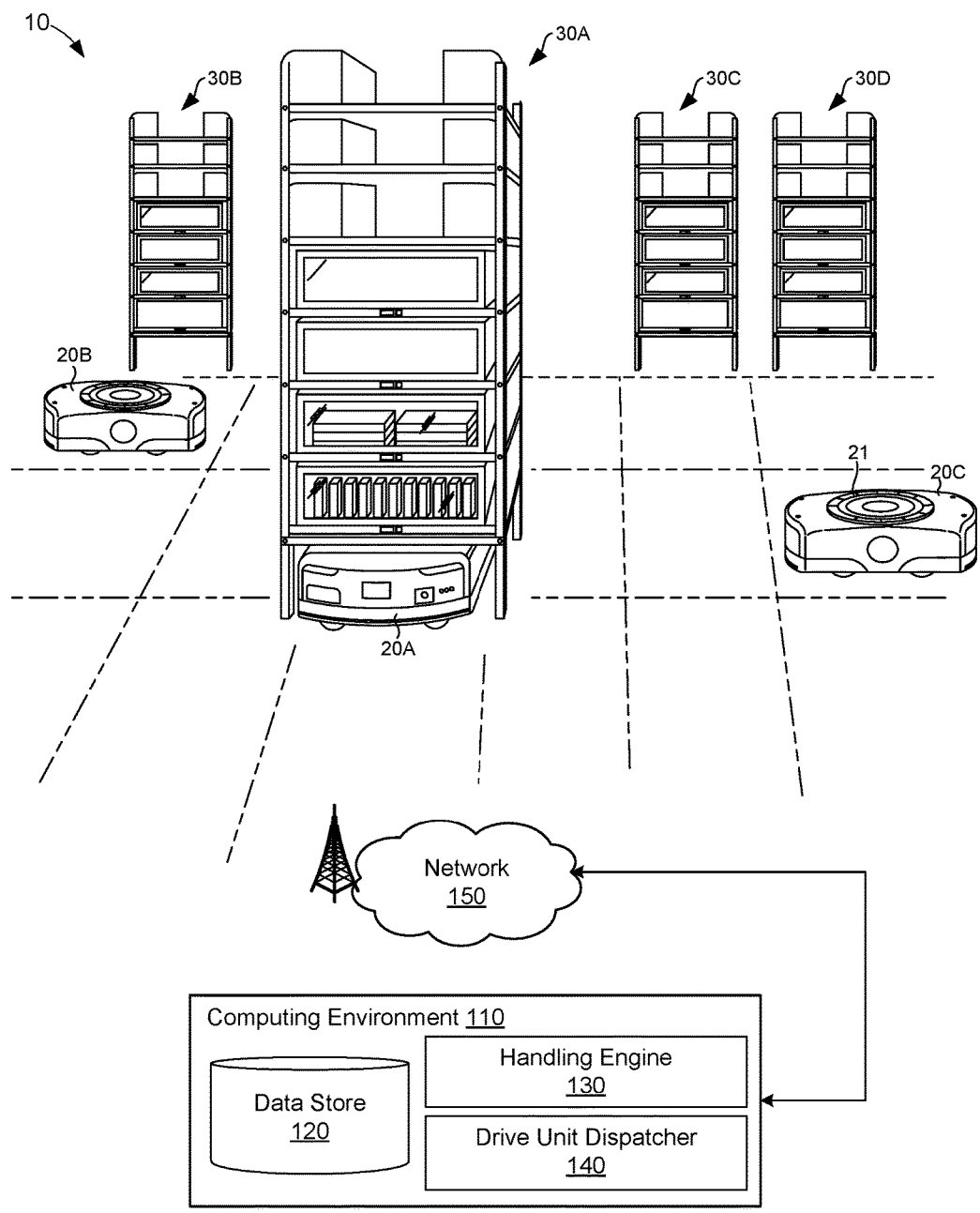
FIG. 1 illustrates a networked environment for forecasted robotic drive dispatch according to example embodiments described herein.

To provide additional context for discussion, FIG. 1 illustrates a networked environment 10 for forecasted robotic drive dispatch according to example embodiments described herein. As shown in FIG. 1, the networked environment 10 includes robotic drive units ("drive units") 20A-20C, inventory pods 30A-30D, and a computing environment 110. As discussed below with reference to FIG. 2, the computing environment 110 can be co-located with the drive units 20A-20C and the inventory pods 30A-30D in a materials handling facility, remotely located from the materials handling facility, or geographically distributed among a number of locations including or excluding the materials handling facility. The computing environment 100 includes a data store 120, a handling engine 130, and a drive unit dispatcher 140. The networked environment 10 also includes a network 150 for communications between the computing environment 110 and the drive units 20A-20C. Before turning to a more detailed description, it is noted that FIG. 1 illustrates a representative example of certain components that can be relied upon in the networked environment 10. The embodiments encompass the use of additional, fewer, different, and/or equivalent components. For example, different types of drive units 20A-20C and inventory pods 30A-30D can be relied upon in various embodiments, and the concepts described herein can be applied to other types of automated inventory system resources at various locations.

As shown in FIG. 1, the drive units 20A-20C can navigate about an area, such as a materials handling facility, fulfillment center, warehouse, distribution center, shopping center, manufacturing facility, etc. The drive units 20A-20C can also transport the inventory pods 30A-30D or other inventory holders, shelves, pallets, items, etc., from place to place in the materials handling facility. In the example shown in FIG. 1, the drive units 20A-20C are relied upon to retrieve the inventory pods 30A-30D and transport them to and from various materials handling stations in a materials handling center. For example, once the inventory pod 30A is retrieved and transported to a materials handling station by the drive unit 20A, one or more individuals can perform materials handling actions (e.g., picking, packing, assembling, inspecting, etc.) with one or more items on or in the inventory pod 30A. After those actions are completed, the drive unit 20A can return the inventory pod 30A to a location for storage.

The drive units 20A-20C can be embodied as autonomous or semi-autonomous robotic drive units including processing circuitry and one or more batteries, motors, drive wheels, stabilizing wheels, sensors, docking ports, and docking and/or lifting components, among other components. To propel the drive units 20A-20C, each can include power circuitry to supply power to the drive motors and drive wheels. In that context, the drive units 20A-20C can include a combination of various types of drive and/or stabilization wheels, axles, transmissions, and other related components.

For navigation, the drive units 20A-20C can include one or more sensors or related systems, such as light sensors, radar sensors, light imaging detection and ranging (LiDAR) sensors, imaging sensors, radio-frequency triangulation systems, global positioning systems (GPS), or other sensors or systems to detect or determine the locations of the drive units 20A-20C. The drive units 20A-20C can also use the sensors or related systems to identify and avoid obstacles, confirm the locations of other drive units, inventory pods, and perform other navigation-related tasks.

The drive units 20A-20C can also include physical and logical (e.g., protocol) layers of one or more communications subsystems, such as cellular, 802.11-based (WiFi), Bluetooth®, or other suitable communications subsystems. Using the communications subsystems, the drive units 20A-20C can communicate with the computing environment 110 over the network 150. Thus, as described in further detail below with reference to FIGS. 2 and 3, the computing environment 110 can develop instructions for and direct the overall operation of the drive units 20A-20C, among others, over wireless communications channels in the networked environment 10.

At the direction of the computing environment 110, the drive units 20A-20C can execute various actions, such as moving to certain locations, retrieving inventory pods or items, moving inventory pods or items, returning inventory pods or items, charging, etc. In the context of moving the inventory pods 30A-30D and/or other items, the drive units 20A-20C can also include one or more docking components, and the docking component 21 of the drive unit 20C is specifically referenced in FIG. 1 as an example. The docking component 21 can be used by the drive unit 20C to maneuver the inventory pods 30A-30D, among other items, by lifting, lowering, rotating, or otherwise moving the inventory pods 30A-30D. The docking component 21 can include any suitable combination of electrical and/or mechanical components to secure and move the inventory pods 30A-30D.

The inventory pods 30A-30D can include a frame structure, shelves, cabinets, dividers, a docking surface, etc. The inventory pods 30A-30D can hold various items of inventory, parts, or other types of items or materials on selves or similar surfaces. In one aspect, the frame structures of the inventory pods 30A-30D can provide an open lower space or underside opening. The drive units 20A-20C can position (e.g., drive) themselves underneath and into the underside opening of the inventory pods 30A-30D and lift the inventory pods 30A-30D up for transportation.

As described in further detail below with reference to FIG. 2, the computing environment 110 can be embodied as one or more computing devices or systems, and the handling engine 130 and the drive unit dispatcher 140 are representative of functional components or modules of the computing environment 110. The handling engine 130 is configured to determine a queue of materials handling actions to be conducted at one or more materials handling stations in the networked environment 10. For example, based on a number of incoming orders to be fulfilled (e.g., assembled, picked, packed, etc.) for delivery, the handling engine 130 can determine a number of pick and pack actions required to fill the orders. In that context, the handling engine 130 can also determine which of the inventory pods 30A-30D, among others, include the items that must be picked to fill the orders. The materials handling actions and data associated with those actions can be stored in the data store 120 for processing by the handling engine 130 and the drive unit dispatcher 140 as described herein.

Based on the queue of materials handling actions determined by the handling engine 130, the drive unit dispatcher 140 is configured to generate instructions for the drive units 20A-20C to assist with those actions. The instructions can direct one or more of the drive units 20A-20C, respectively, to perform various tasks, such as to retrieve a certain one of the inventory pods 30A-30D, relocate it to a materials handing station, return it to its original location, etc. While the drive units 20A-20C can operate autonomously at least to some extent for obstacle avoidance, moving and balancing the inventory pods 30A-30D, etc., the drive unit dispatcher 140 coordinates the overall dispatch of and conflicts between the drive units 20A-20C.

Depending on how quickly (or slowly) the materials handling actions are being completed at various materials handling stations, however, one or more of the drive units 20A-20C can remain idle for periods of time. For example, while the drive unit 20A transports the inventory pod 30A to a materials handling station for certain materials handling actions, one or both of the drive units 20B and 20C may remain idle, waiting for directions from the drive unit dispatcher 140 to support other actions. In some cases, even when a relatively long list of materials handling actions are queued-up by the handling engine 130, the drive units 20B and 20C may remain idle if the execution of those actions is proceeding slowly or for other reasons. The idling of the drive units 20B and 20C amounts to waste of the automated resources in the networked environment 10. To make matters worse, when the drive units 20B and 20C are finally provided with directions from the drive unit dispatcher 140, it can take a relatively long time for the drive units 20B and 20C to start moving, gain speed and momentum, and receive clearance to enter a lane for movement.

To more effectively use the drive units 20A-20C, the drive unit dispatcher 140 is configured to anticipate or forecast the need for the drive units 20A-20C at certain locations or zones in the materials handling facility. As one example, the drive unit dispatcher 140 can monitor the ongoing status of materials handling actions as they are completed at various materials handling stations over time, with reference to the data store 120, for example. The drive unit dispatcher 140 can then forecast a timeframe that a particular materials handling action in the queue of actions can be expected to occur in the future. Along with that timeframe, the drive unit dispatcher 140 can identify one or more inventory pods, such as the inventory pod 30D, needed to complete the particular materials handling action. Then, before the drive unit 20B receives any particular instructions to retrieve the inventory pod 30D, the drive unit dispatcher 140 can dispatch the drive unit 20B toward a zone or region including the inventory pod 30D. By dispatching the drive unit 20B toward the inventory pod 30D, the drive unit 20B may be closer to the location of the inventory pod 30D when it finally receives instructions to retrieve the inventory pod 30D. Other examples of forecasted robotic drive unit dispatch are described below. Overall, forecasted robotic drive unit dispatch can be used to increase efficiency at materials handling centers and mitigate certain technical problems, such as drive space conflicts, drive unit bottlenecks, drive unit crowding or bunching, and other problems.

Figure 2:
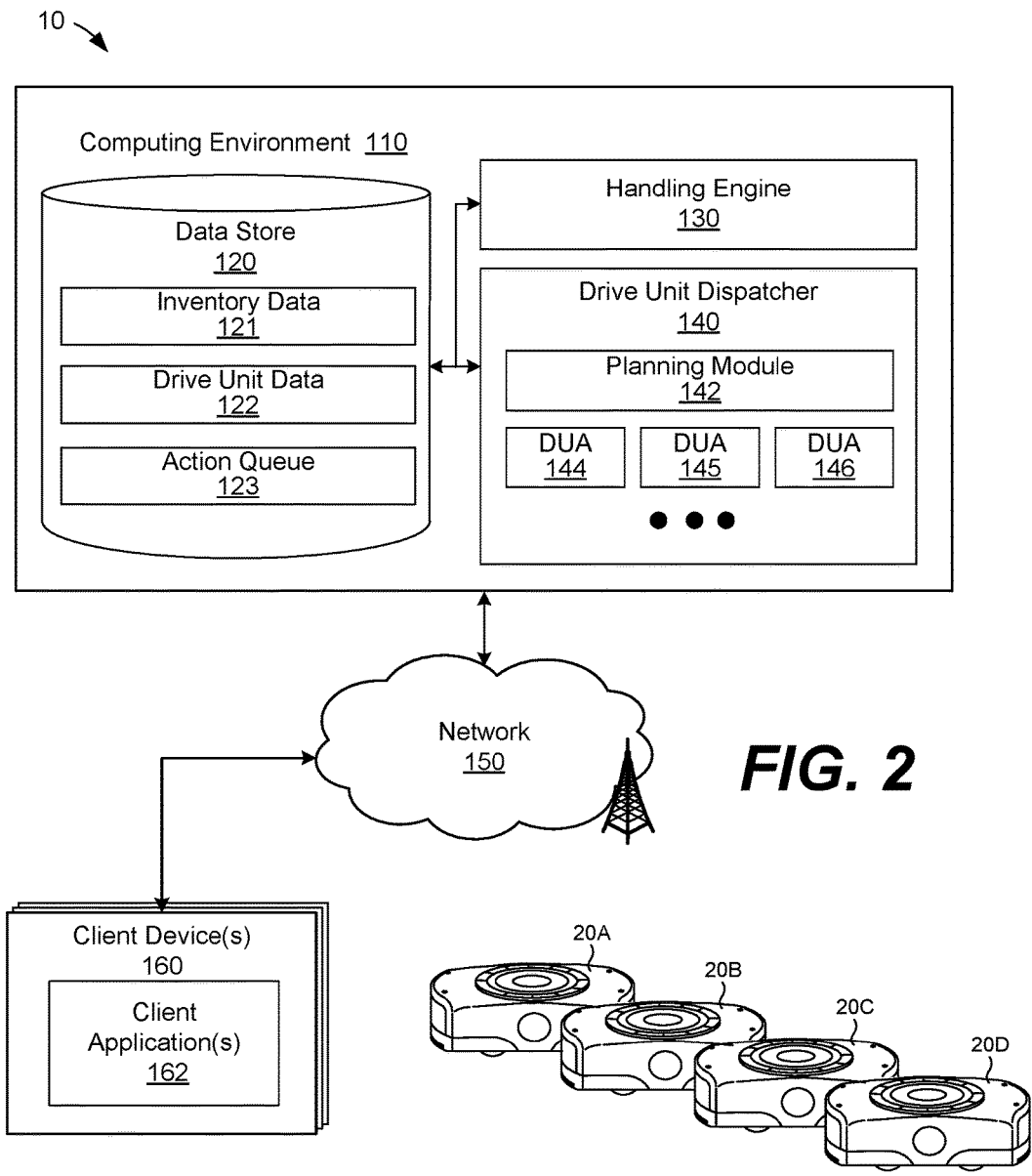
FIG. 2 illustrates components of a computing environment in the networked environment shown in FIG. 1 according to example embodiments described herein.

FIG. 2 illustrates additional components of the computing environment 110 in the networked environment 10 shown in FIG. 1. As shown, the data store 120 includes memory areas to store inventory data 121, drive unit data 122, and the action queue 123, among other types of data. The drive unit dispatcher 140 includes a planning module 142 and drive unit agents (DUAs) 144-146. Also, the networked environment 10 further includes a client device 160, and drive units 20A-20D are shown in FIG. 2.

The computing environment 110 can include one or more computing devices arranged in one or more server or computer banks. In that context, the computing environment 110 can include one or more web servers, application servers, and other server computers. In some cases, the computing environment 110 can additionally or alternatively include desktop, laptop, or other types of computing devices. The computing devices that embody the computing environment 110 can be located at a single installation site or distributed among different geographical locations. Thus, the computing environment 110 can be co-located, at least in part, with the client devices 160 or geographically dislocated form the client devices 160. As further described below in connection with FIG. 5, the computing environment 110 can include a plurality of computing devices that together embody a hosted computing resource, a grid computing resource, and/or other distributed computing arrangement. In some cases, the computing environment 110 can be embodied as an elastic computing resource where an allotted capacity of processing, network, storage, or other computing-related resources vary over time.

The computing environment 110 can also be embodied in part as various functional or logical elements (e.g., executed computer-readable instructions, logic circuitry, processing circuitry, etc.) executed or operated to direct it to perform aspects of the embodiments described herein. In that context, the handling engine 130 and drive unit dispatcher 140 can be embodied as functional or logical elements of the computing environment 110.

The network 150 can include the Internet, intranets, extranets, wide area networks (WANs), local area networks (LANs), wired networks, wireless (e.g., cellular, 802.11-based (WiFi), bluetooth, etc.) networks, cable networks, satellite networks, other suitable networks, or any combinations thereof. The computing environment 110 can communicate with the client device 160 and the drive units 20A-20C using various systems interconnect models and/or protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation. Although not illustrated, the network 150 can include connections to any number of network hosts, such as website servers, file servers, networked computing resources, databases, data stores, or any other network or computing architectures.

The client device 160 is representative of one or more client devices. The client device 160 can be embodied as any computing device, processing circuit, or processor based device or system, including those embodied in the form of a desktop computer, a laptop computer, a personal digital assistant, a wearable computing device, a cellular telephone, or a tablet computer, among other example computing devices and systems. The client device 160 can include one or more subsystems and/or peripheral devices. For example, the peripheral devices may include one or more input devices, such as a keyboard, keypad, touch pad, touch screen, microphone, scanner, mouse, joystick, camera, one or more buttons, etc. The peripheral devices may also include a display, indicator lights, speakers, GPS circuitry, accelerometer, or other components, depending upon the primary use of the client device 160.

As illustrated in FIG. 2, the client device 160 can execute various applications, such as the client application 162. In one embodiment, the client application 162 can be embodied as a browser application that receives and renders network pages generated by the computing environment 110 via the network 150. In that sense, the client application 162 can be embodied as a hypertext-based internet browser or any other type of browser, without limitation. Alternatively, the client application 162 can include a standalone or dedicated application that interacts with the computing environment 110 using a suitable protocol via the network 150. In one aspect of the embodiments, the client application 162 can be used to access, interact with, and/or control the operations of the computing environment 110 with regard to various materials handling actions.

Turning back to the computing environment 110, the data store 120 includes memory areas for the inventory data 121, the drive unit data 122, and the action queue 123. The inventory data 121 includes inventory information or data related to the items of inventory in a materials handling facility, for example, or another related facility. The inventory data 121 can identify what items, parts, resources, etc., are available, in what quantity, and where that inventory is located. For example, the inventory data 121 can include a database that identifies what items (and quantity of items) are stored on each of the inventory pods 30A-30D.

The drive unit data 122 can include data related to the drive units 20A-20D, among others. In that context, the drive unit data 122 can include information about the current and past locations of the drive units 20A-20D, route scheduling and planning information including the routes previously and currently assigned to the drive units 20A-20D, drive space or segment reservation or allocation information, the battery charge level of the drive units 20A-20D, estimated arrival or departure time information for the drive units 20A-20D, the allocated or assigned drive (or rest) space of the drive units 20A-20D, the identifier of an inventory pod or other item(s) being carried by the drive units 20A-20D, and other related information.

The action queue 123 can include a list or queue of materials handling actions to be conducted at one or more materials handling stations in a materials handling facility. For example, based on a number of incoming orders to be fulfilled (e.g., assembled, picked, packed, etc.) for delivery, the handling engine 130 can determine a number of pick and pack actions required to fill the orders. In that context, the handling engine 130 can also determine which of the inventory pods 30A-30D, among others, store or hold the items that must be picked to fill the orders. The materials handling actions and data associated with those actions can be stored as the action queue 123 for reference by the handling engine 130 and the drive unit dispatcher 140 over time.

The drive unit dispatcher 140 includes the planning module 142 and the drive unit agents (DUAs) 144-146, among others. The drive unit dispatcher 140 works in connection with the handling engine 130 to dispatch the drive units 20A-20D at appropriate timings and to particular locations so that the inventory pods 30A-30D can be retrieved and moved to materials handing stations over time. In the drive unit dispatcher 140, the planning module 142 provides certain instructions to individual ones of the DUAs 144-146, and each of the DUAs 144-146 develops an appropriate route for a respective one of the drive units 20A-20D. Thus, the drive unit dispatcher 140 can include more DUAs than that shown in FIG. 2, based on the number of the drive units in any given case.

In one example case, as the routes for the drive units 20A-20D are developed by the DUAs 144-146, the DUAs 144-146 can segment the routes into smaller lengths of drive spaces. The DUAs 144-146 can then submit a request to the planning module 142 for the allocation (and eventual release) of the drive spaces as the drive units 20A-20D move along a route in a materials handling facility. However, the planning module 142 and the drive unit agents (DUAs) 144-146 can coordinate the drive operations of the drive units 20A-20D, among others, in other suitable ways.

According to other aspects of the embodiments, the planning module 142 is configured to anticipate or forecast the need for the drive units 20A-20C at certain locations or zones over time. To accomplish that goal, the planning module 142 can monitor the ongoing status of materials handling actions in the action queue 123 over time. The planning module 142 can then forecast a timeframe that various materials handling actions in the action queue 123 can be expected to occur (or need to occur) in the future at one or more materials handling stations. The planning module 142 can then identify one or more inventory pods needed to complete the materials handling actions. Then, the planning module 142 can instruct one of the DUAs 144-146 to develop a forecasted route for one or more idle drive units 20A-20C. The forecasted route, when followed, will direct the idle drive units 20A-20C toward an inventory pod zone (or other area) having one or more items, for example, that are about to be needed at a materials handling station in the near future. Additional operational and functional aspects of the handling engine 130 and the drive unit dispatcher 140 are described in further detail below with reference to FIG. 3.

Figure 3:
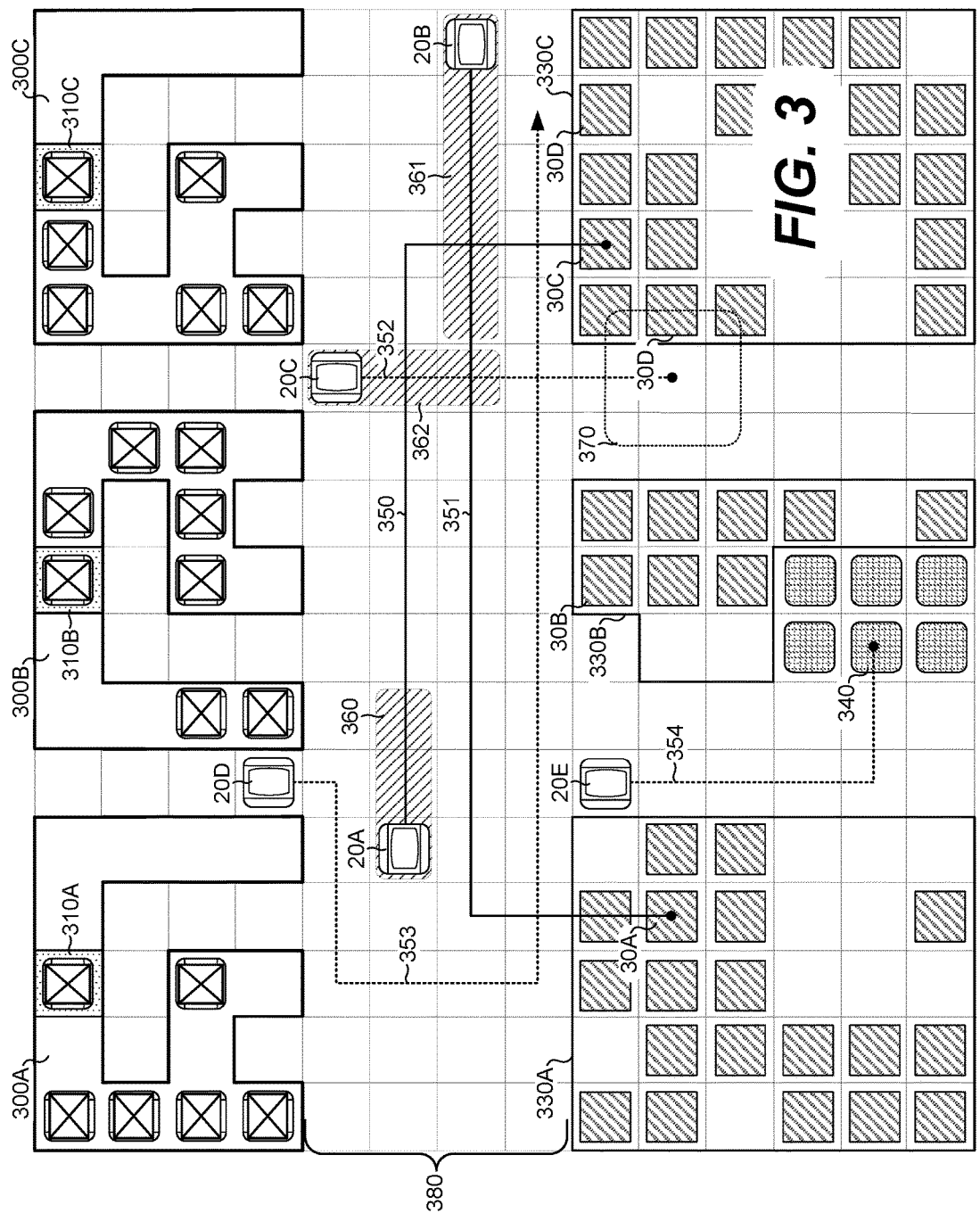
FIG. 3 illustrates the dispatch of drive units on various routes according to example embodiments described herein.

FIG. 3 illustrates the dispatch of drive units 20A-20D on various routes including materials handling and forecasted routes. In that context, FIG. 3 shows a plan layout of an area in a materials handling facility. The area includes materials handing stations 300A-300C with materials handling areas 310A-310C, respectively. The area also includes storage regions 330A-330C where inventory pods 30A-30D, among others, can be placed for storage, and charging stations 340 to charge the drive units 20A-20E. The open region 380 can be used by the drive units 20A-20E as a type of lane or highway to move among the materials handling stations 300A-300C, the storage regions 330A-330C, and other regions in the materials handling facility.

FIG. 3 illustrates a number of unit spaces or blocks within which the drive units 20A-20D, materials handing stations 300A-300C, storage regions 330A-330C, inventory pods 30A-30D, and other components reside in the materials handling facility. As discussed below, the routes of the drive units 20A-20D can be authorized or allocated to the drive units 20A-20D in a number of those unit spaces at a time. However, the embodiments are not limited to the use of any unit spaces or blocks to logically organize the storage of items, organization of space, or dispatch of drive units. Instead, the concepts of forecasted robotic drive unit dispatch described herein can be applied to any suitable arrangement of space in any facility with or without any logical construct to define space.

As indicated above, the handling engine 130 can determine a queue of materials handling actions to be conducted at the materials handling stations 300A-300C. The queue of materials handling actions can be based on a number of incoming orders to be fulfilled (e.g., assembled, picked, packed, etc.) for delivery, a number of units ordered for assembly, or any other related materials handing tasks. In that context, FIG. 3 shows several drive units carrying inventory pods through the materials handling stations 300A-300C. The drive units queued-up in the materials handling stations 300A-300C can be representative of (or related to) a limited set of a larger number of materials handling actions stored in the action queue 123 and awaiting completion.

At the materials handling areas 310A-310C in the materials handling stations 300A-300C, one or more individuals can pick, pack, assemble, or conduct other materials handling operations using various items being carried in the inventory pods on drive units. For reference by the individuals, one or more of the client devices 160 can be located at each of the materials handling areas 310A-310C to provide user interfaces related to the ongoing materials handling operations. Depending upon the speed at which the materials handling operations are completed at the materials handling areas 310A-310C, the drive units and inventory pods can move more quickly or slowly through the materials handling stations 300A-300C.

To keep a number of drive units queued-up in the materials handling stations 300A-300C, the planning module 142 can reference the action queue 123 to identify a particular inventory pod, such as the inventory pod 30C, associated with the next materials handling action to be completed at the materials handling station 300C, for example, among others. In turn, the planning module 142 can communicate with the DUA 144, for example, to requisition the drive unit 20A. In that sense, the planning module 142 can communicate with the DUA 144 to instruct or request that the DUA 144 develop a materials handling route 350 for the drive unit 20A to retrieve the inventory pod 30C from the storage region 330C and return the inventory pod 30A to the materials handling station 300C.

As the materials handling route 350 is developed by the DUA 144, the DUA 144 can coordinate with the planning module 142 to allocate drive space for the drive unit 20A to move along the route 350 over time. The drive space 360 is an example of space allocated to the drive unit 20A by the planning module 142. Until the drive unit 20A has moved beyond the drive space 360 (or portions of it), the planning module 142 can reserve that floor area or space (or portion of it) and deny any other drive units from being permitted or allocated access to it. In that way, conflicts can be avoided. With the drive space 360 allocated, the DUA 144 can dispatch the drive unit 20A to move along the route 350.

As another example, the planning module 142 can reference the action queue 123 to identify that the inventory pod 30A is needed for another materials handling action at the materials handling station 300A. The planning module 142 can then communicate with the DUA 145, for example, to instruct the DUA 145 to develop a materials handling route 351 for the drive unit 20B to retrieve the inventory pod 30A from the storage region 330A and return the inventory pod 30A to the materials handling station 300A. As the materials handling route 351 is developed, the DUA 145 can coordinate with the planning module 142 to allocate the drive space 361, among other spaces along the route 351, to move along the route 351 over time. With the drive space 361 allocated, the DUA 145 can dispatch the drive unit 20B to move along the route 351. The materials handling routes 350 and 351 can be distinguished from the forecasted routes described below, which are not necessarily associated with one particular materials handling action in the action queue 123.

Beyond directing the dispatch of drive unit routes for as-needed materials handling actions, the planning module 142 can reference the speed at which the materials handling operations are being completed at the materials handling areas 310A-310C, for example, to forecast one or more timeframes during which later materials handling actions in the action queue 123 could be (or should be) expected to occur at some future times. Such forecasted timeframes can include one or more specific times, time ranges, or combinations of specific times and time ranges, along with a certainty metric in some cases. Additionally, with reference to the materials handing actions in the action queue 123, the planning module 142 can identify one or more inventory pods that must be retrieved from the storage regions 330A-330C and moved to the materials handling areas 310A-310C to complete the later materials handing actions at the future times.

Thus, in one embodiment, the planning module 142 is configured to look ahead into the action queue 123 to determine both a forecasted timeframe and associated inventory pod, such as the inventory pod 30D, that will be needed to complete a later-in-time materials handing action. Then, the planning module 142 can forward the forecasted timeframe and identifier for the inventory pod 30D to the DUA 146 of the idle drive unit 20C, for example, to develop the forecasted route 352 to the inventory pod 30D. One goal of the forecasted route 352 can be to return with the inventory pod 30D at one of the materials handling stations 300A-300C on or about at the forecasted timeframe at which the inventory pod 30D will be needed. In that way, the queue of drive units at the materials handling stations 300A-300C is not increased to an unsuitable level.

For additional flexibility, the planning module 142 can direct the DUA 146 to develop the forecasted route 352 towards the inventory pod zone 370, which encompasses an area around the inventory pod 30D, rather than the inventory pod 30D itself. Thus, in some cases, the planning module 142 can survey the action queue 123 to identify a frequency at which a number of inventory pods within a region or zone are needed (or are likely to be needed) in the future, and direct the DUA 146 to develop the forecasted route 352 in the more general direction toward that zone rather than to a particular inventory pod. After the drive unit 20C has started moving and is closer to the inventory pod zone 370, for example, the planning module 142 can redirect the drive unit 20C to retrieve and return the inventory pod 30D or, potentially, some other inventory pod. The inventory pod zone 370 can be larger or smaller in various cases as compared to that shown in FIG. 3.

In still other cases, the planning module 142 can simply reference a past history of the velocity (e.g., use or retrieval frequency) of inventory pods among the storage regions 330A-330C and direct one or more idle drive units toward one or more inventory pod zones where, historically, high-velocity inventory pods are stored. By putting idle drive units into motion along forecasted routes, various advantages can be obtained. Among other advantages, the relatively long time it takes to bring a drive unit up to full speed can be avoided if the drive unit is moving when finally redirected to a particular inventory pod. Further, the planning module 142 can begin to allocate and optimize space for the forecasted route along with the other (not forecasted) materials handling routes at an earlier time, potentially avoiding delays, conflicts, and/or arriving at a fewer number of overall stops, turns, and moves for all the drive units. Additionally, the forecasted routes lead to drive units being closer to the needed inventory pods at the time they are finally directed to them.

Because one goal of forecasted routes can be to return with an inventory pod at a forecasted time or timeframe in the future, the planning module 142 can leverage the flexibility in those timeframes to prioritize defined, materials handling routes (e.g., the routes 350 and 351) over forecasted routes (e.g., the route 352) in certain cases. Thus, the planning module 142 can deny an initial request to allocate the drive space 362 for the drive unit 20C, for example, based on knowledge that the drive unit 20B is about to submit a request to allocate a portion of that drive space in the near future for the drive unit 20B, even if the request to allocate the drive space 362 is received first. In that context, it can be appreciated how the planning module 142 can prioritize the current and/or future needs of defined, materials handling routes over forecasted routes.

The planning module 142 can leverage the flexibility for forecasted routes in other ways. In another example case, a DUA for the drive unit 20D can develop a longer, meandering forecasted route 353 for the drive unit 20D when the timeframe for the route permits it, to avoid any potential conflict with the route 350 of the drive unit 20A. As shown in FIG. 3, rather than driving across (and potentially interfering with) the route 350, the forecasted route 353 wraps around and behind the route 350. In another example, the idle drive unit 20E can be directed along the route 354 toward an inventory pod or inventory pod zone. If additional time is available in the forecasted timeframe for the drive unit 20E, the drive unit 20E can be directed to stop at the charging station 340 before being redirected at a later time.

Figure 4A:
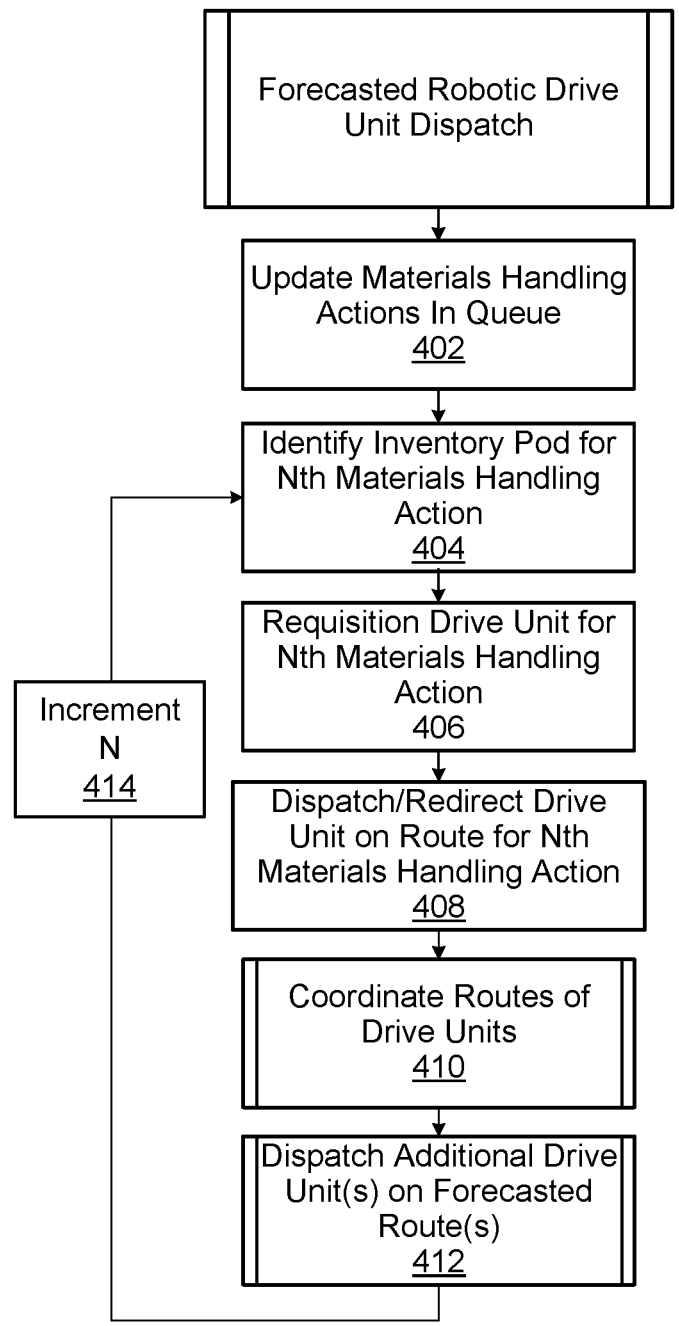
FIGS. 4A-4C illustrate a process of forecasted robotic drive dispatch performed by the computing environment shown in FIG. 2 according to various example embodiments described herein.
Figures 4B, 4C:
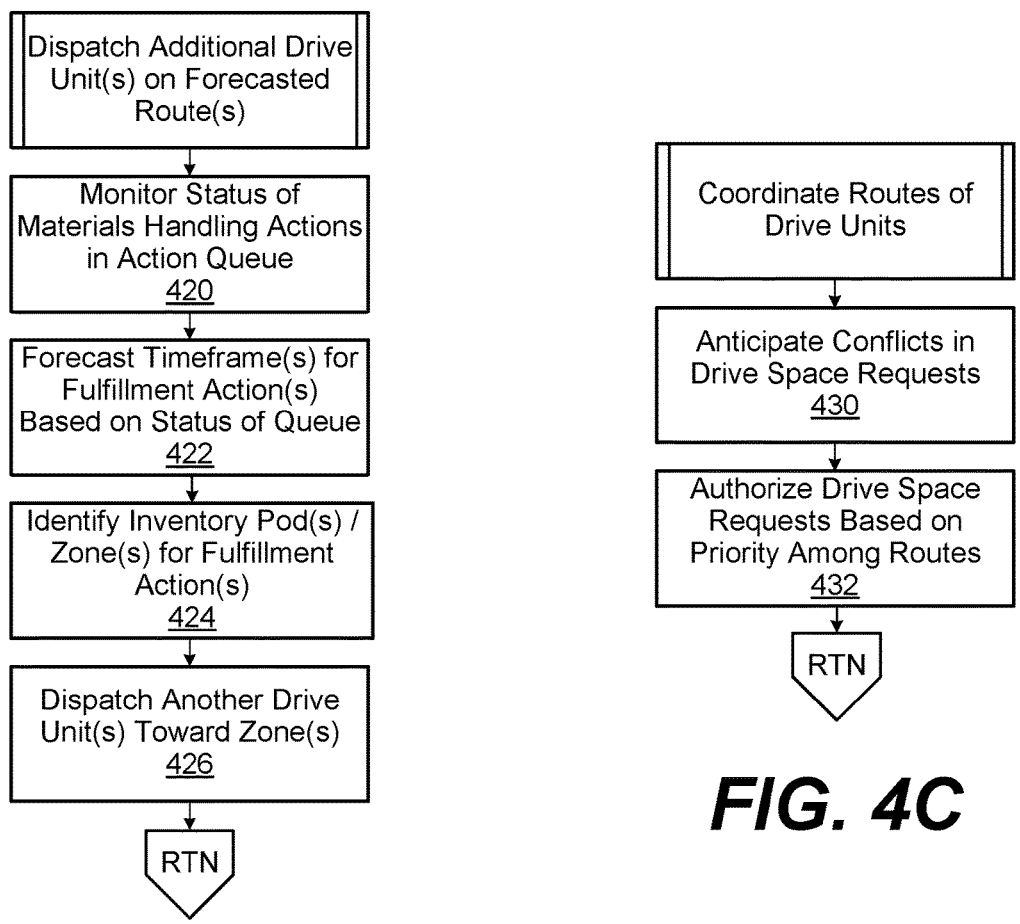

Building on the description above, FIGS. 4A-4C illustrate a process of forecasted robotic drive dispatch performed by the computing environment 110 shown in FIG. 2. In certain aspects, the process flowcharts in FIGS. 4A-4C can be viewed as an example set of steps for forecasted robotic drive dispatch. Thus, the process flowcharts in FIGS. 4A-4C provide a representative example of a functional sequence or arrangement of steps that can be employed to implement the aspects of forecasted robotic drive dispatch described herein. Although the process is described in connection with the computing environment 110 and drive units 20A-D shown in FIGS. 1-3, other computing environments, drive units, systems, and/or devices can perform the process. Additionally, although not explicitly described or illustrated, any number of intermediate data accessing and storing steps can be performed among the handling engine 130, the drive unit dispatcher 140, and other components in the computing environment 110 among each of the process steps.

At reference numeral 402, the process includes the handling engine 130 updating or determining various materials handling actions to be conducted at one or more materials handling stations, and storing those materials handling actions in the action queue 123. For example, based on a number of incoming orders to be fulfilled for delivery, the handling engine 130 can determine a number of pick and pack actions to be conducted at the materials handing stations 300A-300C to fill the orders. In that context, the handling engine 130 can also determine which inventory pods store or hold the items to fill the orders. The materials handling actions and data associated with those actions can be stored as the action queue 123 for reference by the handling engine 130 and the drive unit dispatcher 140 over time.

At reference numeral 404, the process proceeds to the preliminary, initial steps required to dispatch one or more drive units to retrieve an inventory pod for a given (e.g., Nth) materials handling action. Particularly, at reference numeral 404, the process includes the drive unit dispatcher 140 identifying an inventory pod needed for the next Nth materials handling action among those in the action queue 123.

At reference numeral 406, the process includes the planning module 142 requisitioning a drive unit to retrieve the inventory pod needed for the Nth materials handling action. According to the example shown in FIG. 3, the planning module 142 can communicate with the DUA 145 to requisition the drive unit 20B. Particularly, the planning module 142 instruct or request that the DUA 145 to develop a materials handling route 351 for the drive unit 20B to retrieve the inventory pod 30A from the storage region 330A and return the inventory pod 30A to the materials handling station 300A.

It should be appreciated that, at reference numeral 406, the planning module 142 can examine the availability of all drive units, including any drive units that may have previously been dispatched on forecasted routes. Thus, rather than requisitioning the drive unit 20A at reference numeral 406, the planning module 142 can search for and requisition other previously-dispatched drive units. As shown in FIG. 3, for example, the drive unit 20E was dispatched on the forecasted route 354 in the general vicinity or zone of the storage region 330A, but not finally redirected or assigned to any particular task. In that case, the drive unit 20E may be free for requisitioning by the planning module 142 at reference numeral 406. If needed, time can be saved by requisitioning the drive unit 20E rather than the drive unit 20B, because the drive unit 20E is closer to the inventory pod 30A. If the drive unit 20E is requisitioned at reference numeral 406, then the effect will be to transition the forecasted route 354 of the drive unit 20E into a materials handling route at reference numeral 408.

At reference numeral 408, the process includes a DUA of the drive unit requisitioned at reference numeral 406 dispatching the drive unit on a materials handling route to retrieve and return the inventory pod identified at reference numeral 404. Continuing with one of the examples shown in FIG. 3, as the materials handling route 350 is developed by the DUA 144, the DUA 144 can coordinate with the planning module 142 to allocate drive space for the drive unit 20A to move along the route 350 over time. The drive space 360 is an example of space allocated to the drive unit 20A by the planning module 142. Until the drive unit 20A has moved beyond the drive space 360 (or portions of it), the planning module 142 can reserve that floor area or space (or portion of it) and deny any other drive units from being permitted or allocated access to it. In that way, conflicts can be avoided. With the drive space 360 allocated, the DUA 144 can dispatch the drive unit 20A to move along the route 350.

At reference number 410, the process includes the planning module 142 coordinating the routes of a number of drive units, including drive units on materials handling routes and other drive units on forecasted routes. Because forecasted routes can offer a certain level of flexibility over defined, materials handling routes, the planning module 142 can leverage that flexibility to prioritize certain routes over others, to adjust route lengths for conflict-avoidance within forecasted timeframes, to lower the total number of moves for drive units, and to achieve other advantages described herein. Additional steps in the process of coordinating routes of various drive units are described in further detail below with reference to FIG. 4C.

At reference numeral 412, the process includes the planning module 142 (and one or more DUAs) dispatching additional drive units on forecasted routes. FIG. 4B, described below, illustrates a series of steps in the process of dispatching drive units on forecasted routes. At reference numeral 414, the process increments to the next Nth materials handling action under consideration and returns back to reference numeral 404 (or potentially reference numeral 402) for further processing.

Referring to FIG. 4B, at reference numeral 420 the process includes the planning module 142 monitoring the ongoing status of materials handling actions in the action queue 123 over time. For example, the planning module 142 can reference the speed at which materials handling operations are being completed at the materials handling areas 310A-310C to forecast one or more timeframes during which later materials handling actions in the action queue 123 could be (or should be) expected to occur at some future times.

At reference numeral 422, the process includes the planning module 142 forecasting one or more timeframes at which one or more materials handling actions in the action queue 123 could be (or should be) expected to occur at the materials handling areas 310A-310C. Such forecasted timeframes can include one or more specific times, time ranges, or combinations of specific times and time ranges, along with a certainty metric in some cases.

At reference numeral 424, the process includes the planning module 142 identifying one or more inventory pods that must be retrieved from the storage regions 330A-330C and moved to the materials handling areas 310A-310C for the materials handing actions that were monitored-for and timeframe-forecasted at reference numerals 420 and 422. In some cases, the planning module 142 can also identify one or more inventory pod zones encompassing an area around any number of inventory pods that must be retrieved. At reference numeral 424, the planning module 142 can also survey the action queue 123 to identify a frequency at which a number of inventory pods within a region or zone are needed (or are likely to be needed) in the future to identify an inventory pod zone rather than a particular inventory pod that drive units should be dispatched towards. Thus, the process permits a certain level of flexibility in that drive units dispatched on forecasted routes are not necessarily dispatched to retrieve any particular inventory pod. Instead, they can be dispatched toward larger zones having a greater potential future need for drive units. Further, those drive units can be dispatched on forecasted routes with flexible timeframes during which a task (or potentially some combination of various tasks) should be expected to occur.

At reference numeral 426, the planning module can work in connection with one or more DUAs to dispatch idle drive units on forecasted routes toward inventory pods or zones based on the time or timeframes forecasted at reference numeral 422 and the inventory pods or zones identified at reference numeral 424. With reference to one of the examples in FIG. 3, the planning module 142 can instruct the DUA 146 to dispatch the idle drive unit 20C on the forecasted route 352 to the inventory pod 30D. Alternatively, the planning module 142 can direct the DUA 146 to dispatch the forecasted route 352 towards the inventory pod zone 370, which encompasses an area around the inventory pod 30D, rather than the inventory pod 30D itself.

Turning to FIG. 4C, the process of coordinating various materials handling routes with forecasted routes is described in further detail. Overall, because one goal of forecasted routes can be to return with an inventory pod at a forecasted time or timeframe in the future, the planning module 142 can leverage the flexibility in those timeframes to prioritize defined, materials handling routes over forecasted routes in certain cases.

Referring to FIG. 3 as an example, the process can include the planning module 142 anticipating a conflict in drive space requests between the drive unit 20C, which is operating along the forecasted route 352, and the drive unit 20B, which is operating along the materials handling route 351, at reference numeral 430. The planning module 142 can then prioritize the materials handling route 351 over the forecasted route 352. For example, at reference numeral 432, the process can include the planning module 142 authorizing or allocating drive space for the drive unit 20B in extension to the drive space 361. At the same time, the process can include the planning module 142 denying a request to allocate the drive space 362 for the drive unit 20C, even if the request to allocate the drive space 362 is received before any request to extend the drive space 361.

The planning module 142 can leverage the flexibility for forecasted routes in other ways. In another example case, a DUA for the drive unit 20D can develop a longer, meandering forecasted route 353 for the drive unit 20D when the timeframe for the route permits it, to avoid any potential conflict with the route 350 of the drive unit 20A. As shown in FIG. 3, rather than driving across (and potentially interfering with) the route 350, the forecasted route 353 wraps around and behind the route 350.

By putting idle drive units into motion along forecasted routes, various advantages can be obtained. Among other advantages, the relatively long time it takes to bring a drive unit up to full speed can be avoided if the drive unit is moving when finally redirected to a particular inventory pod. Further, the planning module 142 can begin to allocate and optimize space for the forecasted route along with the other (not forecasted) materials handling routes at an earlier time, potentially avoiding delays, conflicts, and/or arriving at a fewer number of overall stops, turns, and moves for all the drive units. Additionally, the forecasted routes lead to drive units being closer to the needed inventory pods at the time they are finally directed to them.

Figure 5:
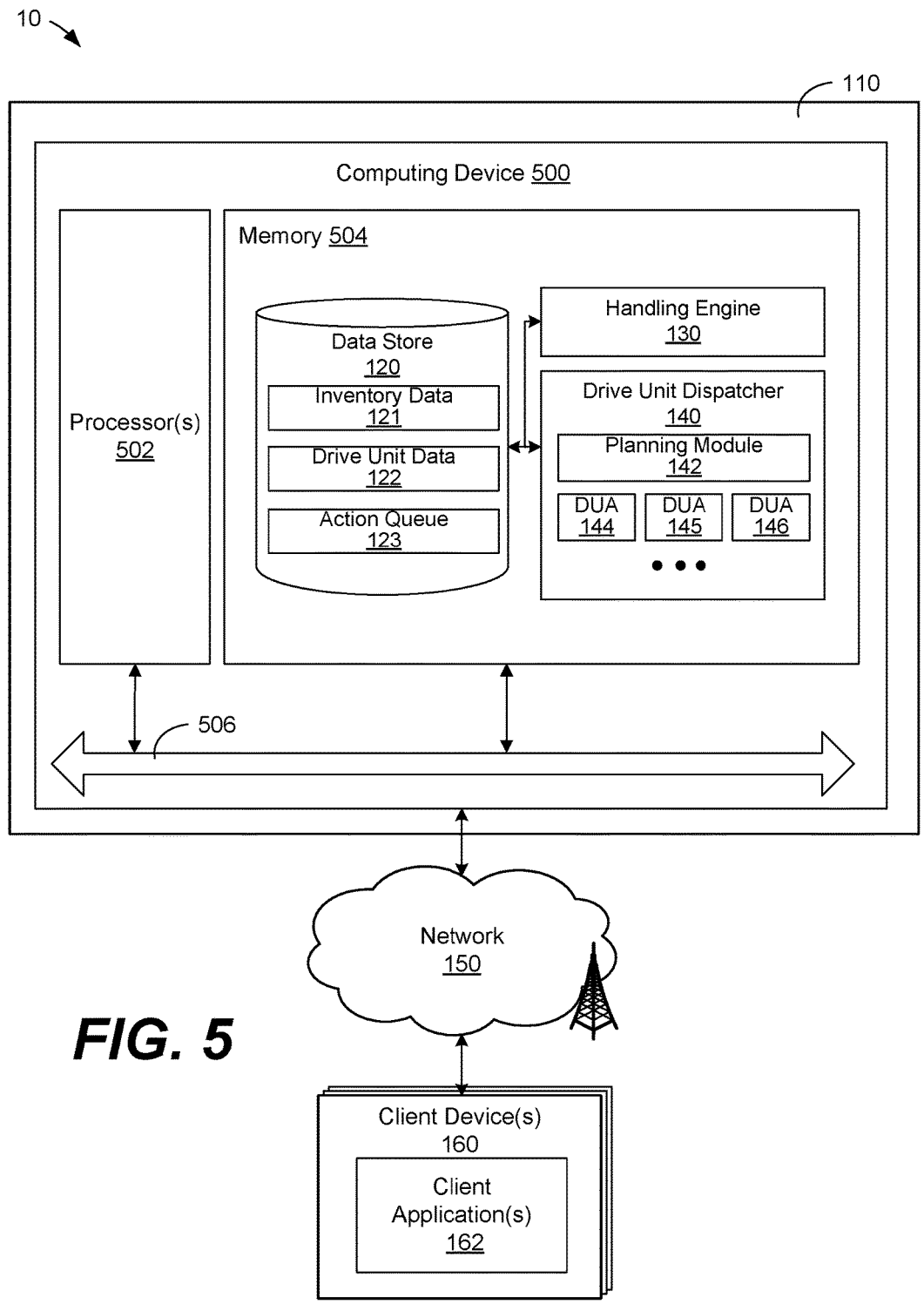
FIG. 5 illustrates an example schematic block diagram of a computing device of the computing environment in the networked environment shown in FIG. 2 according to various embodiments described herein.

FIG. 5 illustrates an example schematic block diagram of a computing device 500 of the computing environment 110 in the networked environment 100 shown FIG. 2 according to various embodiments described herein. As noted above, the computing environment 110 can include a combination or one or more web servers, application servers, and other server, desktop, laptop, and/or other suitable computing devices. At one or more geographic locations, the computing device 500 includes at least one processing system, for example, having a processor 502 and a memory 504, both of which are electrically and communicatively coupled to a local interface 506. The local interface 506 can be embodied as a data bus with an accompanying address/control bus or other addressing, control, and/or command lines.

In various embodiments, the memory 504 stores data and software or executable-code components executable by the processor 502. For example, the memory 504 can store executable-code components associated with the handling engine 130 and the drive unit dispatcher 140 for execution by the processor 502. The memory 504 can also store data such as that stored in the data store 120, among other data.

It is noted that the memory 504 can store other executable-code components for execution by the processor 502. For example, an operating system can be stored in the memory 504 for execution by the processor 502. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 504 stores software for execution by the processor 502. In this respect, the terms "executable" or "for execution" refer to software forms that can ultimately be run or executed by the processor 502, whether in source, object, machine, or other form. Examples of executable programs include, for example, a compiled program that can be translated into a machine code format and loaded into a random access portion of the memory 504 and executed by the processor 502, source code that can be expressed in an object code format and loaded into a random access portion of the memory 504 and executed by the processor 502, or source code that can be interpreted by another executable program to generate instructions in a random access portion of the memory 504 and executed by the processor 502, etc.

An executable program can be stored in any portion or component of the memory 504 including, for example, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 504 can include both volatile and nonvolatile memory and data storage components. Volatile components are those that do not retain data values upon loss of power. Nonvolatile components are those that retain data upon a loss of power. Thus, the memory 504 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 502 can be embodied as one or more processors 502 and the memory 504 can be embodied as one or more memories 504 that operate in parallel, respectively, or in combination. Thus, the local interface 506 facilitates communication between any two of the multiple processors 502, between any processor 502 and any of the memories 504, or between any two of the memories 504, etc. The local interface 506 can include additional systems designed to coordinate this communication, including, for example, a load balancer that performs load balancing.

As discussed above, the handling engine 130 and the drive unit dispatcher 140 can be embodied, at least in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart or process diagrams in FIGS. 4A-4C are representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 502. The machine code can be converted from the source code, etc. Further, each block can represent, or be connected with, a circuit or a number of interconnected circuits to implement a certain logical function or process step.

Although the flowchart or process diagrams in FIGS. 4A-4C illustrate a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Also, any logic or application described herein, including the handling engine 130 and the drive unit dispatcher 140 that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIGS. 4A-4C. In the context of the present disclosure, a non-transitory computer-readable medium can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying at least one program that, when executed by at least one computing device, directs the at least one computing device to perform a method comprising:
   determining a plurality of materials handling actions in a queue to be conducted at a materials handling station;
   identifying an inventory pod associated with a materials handling action among the plurality of materials handling actions in the queue;
   requisitioning a first drive unit for the materials handling action in the queue;
   dispatching the first drive unit on a materials handling route to retrieve and return the inventory pod to the materials handling station;
   monitoring a status of the plurality of materials handling actions in the queue over time;
   forecasting a timeframe for at least one other materials handling action among the plurality of materials handling actions in the queue to occur at the materials handling station based on the status of the plurality of materials handling actions in the queue;
   identifying an inventory pod zone for the at least one other materials handling action; and
   dispatching a second drive unit on a forecasted route toward the inventory pod zone based on the timeframe.

2. The non-transitory computer-readable medium according to claim 1, wherein the method further comprises prioritizing an allocation of drive space for the first drive unit on the materials handling route over the second drive unit on the forecasted route.

3. The non-transitory computer-readable medium according to claim 1, wherein the method further comprises:
   identifying a second inventory pod associated with a second materials handling action among the plurality of materials handling actions in the queue;
   requisitioning the second drive unit for the second materials handling action in the queue; and redirecting the second drive unit from the forecasted route to a second materials handling route to retrieve and return the second inventory pod to the materials handling station.

4. A method, comprising:
monitoring, by at least one computing device, a status of a plurality of materials handling actions at a materials handling station over time;
forecasting, by the at least one computing device, a timeframe for a materials handling action among the plurality of materials handling actions to occur at the materials handling station based on the status of the plurality of materials handling actions;
identifying, by the at least one computing device, an inventory pod zone for the materials handling action; and
dispatching, by the at least one computing device, a drive unit on a forecasted route toward the inventory pod zone based on the timeframe.

5. The method according to claim 4, wherein the forecasted route comprises a meandering route selected about the inventory pod zone to approximate the timeframe for the materials handling action.

6. The method according to claim 4, wherein forecasting the timeframe for the materials handling action to occur comprises determining, by the at least one computing device, an estimated time for picking an item off an inventory pod at the materials handling station with reference to a progress of the plurality of materials handling actions at the materials handling station.

7. The method according to claim 6, wherein the inventory pod zone comprises a zone encompassing the inventory pod among a plurality of other inventory pods.

8. The method according to claim 4, further comprising:
requisitioning, by the at least one computing device, a second drive unit for a second materials handling action among the plurality of materials handling actions; and
dispatching, by the at least one computing device, the second drive unit on a materials handling route to retrieve and return an inventory pod to the materials handling station.

9. The method according to claim 8, further comprising prioritizing, by the at least one computing device, an allocation of drive space for the materials handling route over the forecasted route.

10. The method according to claim 8, further comprising:
anticipating, by the at least one computing device, a conflict in drive space between the forecasted route and the materials handling route; and
modifying, by the at least one computing device, at least one of the forecasted route or the materials handling route to avoid the conflict in drive space.

11. The method according to claim 8, further comprising:
anticipating, by the at least one computing device, a conflict in drive space between the forecasted route and the materials handling route; and
delaying, by the at least one computing device, the drive unit on the forecasted route to avoid the conflict in drive space.

12. The method according to claim 8, further comprising, after dispatching the second drive unit on the materials handling route to retrieve and return the inventory pod to the materials handling station, redirecting, by the at least one computing device, the drive unit from the forecasted route to a second materials handling route to retrieve and return a second inventory pod to the materials handling station.

13. A system, comprising:
a memory device configured to store computer-readable instructions thereon; and
at least one computing device configured, through execution of the computer-readable instructions, to:
identify an inventory pod associated with a materials handling action;
requisition a first drive unit for the materials handling action;
dispatch the first drive unit on a materials handling route to retrieve the inventory pod;
forecast a timeframe for at least one other materials handling action to occur based on a status of a plurality of other materials handling actions; and
dispatch a second drive unit on a forecasted route based on the timeframe.

14. The system of claim 13, wherein the at least one computing device is further configured to monitor a queue of the plurality of other materials handling actions over time to forecast the timeframe for the at least one other materials handling action to occur.

15. The system of claim 13, wherein the at least one computing device is further configured to:
identify an inventory pod zone for the at least one other materials handling action; and
dispatch the second drive unit toward the inventory pod zone on the forecasted route.

16. The system of claim 15, wherein the forecasted route comprises a meandering route selected about the inventory pod zone to approximate the timeframe for the materials handling action.

17. The system of claim 15, wherein:
the inventory pod zone comprises a zone encompassing a second inventory pod among a plurality of other inventory pods; and
the at least one computing device is further configured to:
identify the second inventory pod as being associated with a second materials handling action; and
redirect the second drive unit from the forecasted route to a second materials handling route to retrieve the second inventory pod.

18. The system of claim 13, wherein the at least one computing device is further configured to prioritize an allocation of drive space for the materials handling route over the forecasted route.

19. The system of claim 13, wherein the at least one computing device is further configured to:
anticipate a conflict in drive space between the forecasted route and the materials handling route; and
modify at least one of the forecasted route or the materials handling route to avoid the conflict in drive space.

20. The system of claim 13, wherein the at least one computing device is further configured to:
anticipate a conflict in drive space between the forecasted route and the materials handling route; and
delay the second drive unit on the forecasted route to avoid the conflict in drive space.

* * * * *